Figure 1:
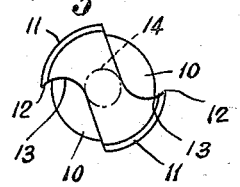
Figure 2:
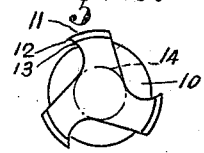
Figure 3:
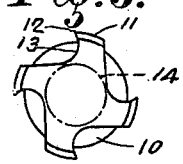
Figure 4:
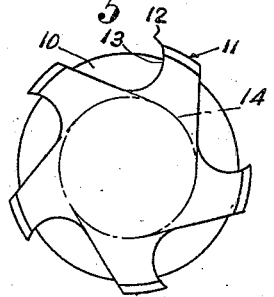
Figure 5:
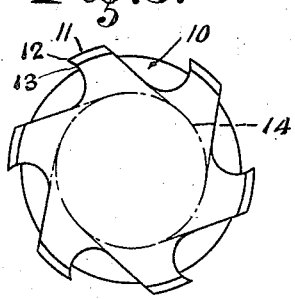
Figure 6:
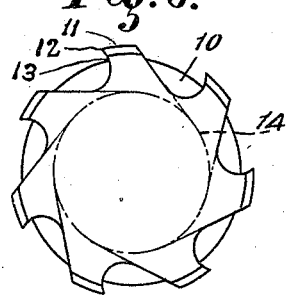
Figure 7:
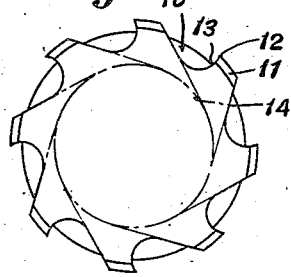
Figure 8:
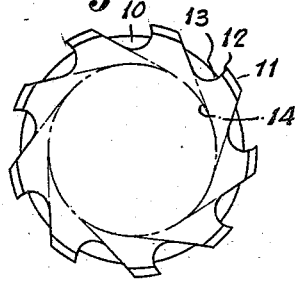
Figure 9:
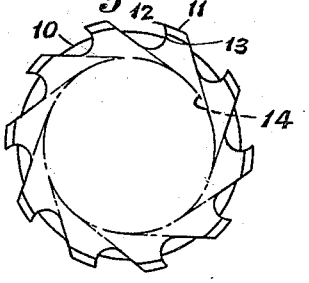

Aug. 5, 1924.  
J. McFARLANE ET AL  
1,503,959  
METHOD OF MAKING SCREW CUTTING TAPS  
Filed April 1, 1922

Inventors,  
John McFarlane and  
Duncan Clelland,  
By Jochum Atty.

Patented Aug. 5, 1924.

1,503,959

UNITED STATES PATENT OFFICE.

JOHN McFARLANE AND DUNCAN CLELLAND, OF GLASGOW, SCOTLAND.

METHOD OF MAKING SCREW-CUTTING TAPS.

Application filed April 1, 1922. Serial No. 548,727.

*To all whom it may concern:*

Be it known that we, JOHN McFARLANE, 110 Beechwood Drive, Broomhill, Glasgow, Scotland, and DUNCAN CLELLAND, 367 Kilbowie Road, Clydebank, Glasgow, Scotland, both subjects of the King of Great Britain, have invented certain new and useful Improvements in Methods of Making Screw-Cutting Taps, of which the following is a specification.

This invention relates to improvements in the method of making screw-cutting taps and is an improvement on the invention described in the specification of the prior United States Letters Patent Number 1,395,198 dated October 25, 1921.

In the specification of the aforesaid prior patent is described a screw-cutting tap, of the type having spiral lands and flutes extending from end to end thereof, having two (or other suitable number of) spiral flutes or channels so shaped and pitched as to produce spiral cuttings and to feed same forward through the hole being tapped.

It is very desirable that the flutes be accurately and properly cut. At present it is the practice to cut the flutes of the taps in accordance with the instructions contained in the aforesaid patent specification but without any definite standard to work to with the result that taps are made, the flutes of which vary more or less and consequently do not, in all cases, give the best results.

The object of the present invention is to manufacture the taps accurately and to this end to provide a standard suitable for all kinds and sizes of tap so that manufacturers may make the same to a standard formula with the certainty that the best results will be obtained. The matter presents some considerable difficulty as it is not an easy matter to devise a formula suitable for all kinds and sizes of tap. After repeated trials and experiments we have found that the leading faces of the flutes (or following faces of the lands) can be determined by a mathematical formula governed by the diameter of the tap and by the number of flutes required to give a datum circle to which an extension of the leading face of each flute (or following face of each land) would, in all cases, be tangential.

In the drawing and referring more particularly to Figures 1 to 9, the numeral 10 designates the flutes, 11 the lands, 12 the leading faces, 13 the following faces of the tap, and 14 designates the datum circle.

The formula for finding the diameter of the datum circle is as follows:—

$$d = \frac{\pi D}{10} + D\left(1 - \frac{\pi}{10}\right)\left(\frac{N-2}{N+4}\right)$$

$$= \text{(approximately)} \frac{3D}{10} + \frac{7D}{10}\left(\frac{N-2}{N+4}\right)$$

where $d$ = diameter of datum circle.
$D$ = diameter of tap.
$N$ = number of flutes in the tap.

Having determined $d$, the datum circle is drawn and divided into N parts, a tangent being struck at each point of intersection. The following faces of the lands (or leading faces of the flutes) will coincide with these tangents. The leading faces of the lands (or following faces of the flutes) and axial pitch of flutes can then be determined by the following rule:—

$$P = \frac{\pi D}{N}$$

$\frac{L}{P}$ (land over pitch) not greater than .75 or less than .10.

$\frac{R}{F}$ not greater than .40 or less than .10.

$\Phi$ not greater than 80° or less than 40°.

$\Theta$ not greater than 30° or less than 10°.

Where N=number of flutes, D=diameter of tap, P=peripheral pitch of flutes, F= width of flute, L=width of land, R=radius of undercut, $\Phi$=angle of centre of radius of undercut to centre line of tap at cutting edge or angle of undercut, $\Theta$=angle of spiral flute to axis of tap.

Figure 10:
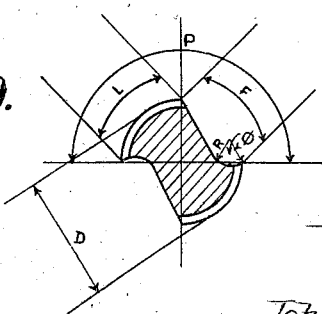
Figure 11:

On the annexed drawings, Figs. 1 to 9 show datum circles with tangents thereto determining the following faces of the lands in accordance with the above formula, while Fig. 10 illustrates the application of the rule for determining the leading faces of the lands, and Fig. 11 the application of the rule to the axial pitch of the flutes.

Having now fully described our invention what we claim and desire to secure by Letters Patent is:—

1. A step in the method of manufacturing a screw cutting tap having reverse hand spiral flutes which consists in determining the diameter of the datum circle by the formula $$d = \frac{\pi D}{10} + D\left(1 - \frac{\pi}{10}\right)\left(\frac{N-2}{N+4}\right);$$

where $d$=diameter of datum circle, $D$=diameter of tap and $N$=number of flutes in the tap.

2. The steps in the method of manufacturing a screw cutting tap having reverse hand spiral flutes which consists in determining the diameter of the datum circle by the formula $$d = \frac{\pi D}{10} + D\left(1 - \frac{\pi}{10}\right)\left(\frac{N-2}{N+4}\right);$$

where $d$=diameter of datum circle, $D$=diameter of tap and $N$=number of flutes in the tap, then dividing the circumference of the datum circle into an equally spaced number of parts equivalent to the flutes of the tap, and cutting the leading faces of the flutes tangential to the datum circle.

3. The method of manufacturing a screw cutting tap having reverse hand spiral flutes which consists in determining the diameter of the datum circle by the formula, $$d = \frac{\pi D}{10} + D\left(1 - \frac{\pi}{10}\right)\left(\frac{N-2}{N+4}\right);$$

where $d$=diameter of datum circle, $D$=diameter of tap, and $N$=number of flutes in the tap, then dividing the circumference of the datum circle into an equally spaced number of parts equivalent to the flutes of the tap, then cutting the leading faces of the flutes tangential to the datum circle, and determining the axial pitch of the leading faces by the formula $$P = \frac{\pi D}{N};$$

where $d$=diameter of datum circle to which the leading faces (or extensions thereof) are tangential, $D$=diameter of tap, $N$=number of flutes, and $P$=axial pitch.

4. The step in the method of manufacturing a screw cutting tap having reverse hand spiral flutes and after the diameter of the datum circle has been determined, which consists in dividing the circumference of the datum circle into an equally spaced number of parts equivalent to the flutes of the tap, then cutting the leading faces of the flutes tangential to the datum circle and determining the axial pitch of the leading faces by the formula $$P = \frac{\pi D}{N};$$

where $d$=diameter of datum circle to which the leading faces (or extensions thereof) are tangential, $D$=diameter of tap, $N$=number of flutes, and $P$=axial pitch.

In testimony whereof we affix our signatures in presence of two witnesses.

JOHN McFARLANE.
DUNCAN CLELLAND.

Witnesses:
ROBERT KENNEDY FLEMING,
JOHN JAMES GRAY.